Patented June 8, 1954

2,680,673

UNITED STATES PATENT OFFICE 2,680,673

PROCESS OF PREPARING ANHYDROUS HYDRAZINE

Charles C. Clark, Kenmore, N. Y., assignor to Mathieson Chemical Corporation, a corporation of Virginia No Drawing. Application July 6, 1951, Serial No. 235,575

4 Claims. (Cl. 23—190)

My invention relates to the production of anhydrous hydrazine by ammonolysis of its salts, and more particularly to improved means for producing anhydrous hydrazine in readily recoverable form from its sulfates by reaction with ammonia in the presence of a low boiling organic solvent at ordinary temperatures.

One of the major difficulties in the way of effective commercial utilization of hydrazine is the difficulty of obtaining it in anhydrous form. The only practical methods for synthesizing hydrazine produce the hydrate, usually in dilute aqueous solution, and concentration of hydrazine beyond the 85% hydrate stage is not possible by fractional distillation because hydrazine and water form an azeotropic mixture. Accordingly, efforts have been made to dehydrate hydrazine by chemical methods which however introduce difficulties of hydrazine recovery. A more promising process, in this respect, for producing free anhydrous hydrazine is the ammonolysis of certain salts, particularly the sulfates. Hydrazine sulfates, for example, may be treated with liquid or gaseous ammonia to obtain free hydrazine, but several serious difficulties discussed below combine to prevent these processes from being feasible, either economically or from an engineering point of view.

The most available salt of hydrazine is the acid sulfate having the formula $N_2H_4.H_2SO_4$. Although this material is relatively difficultly soluble in water and other solvents, it has the advantage over other salts of hydrazine that it is readily obtained in anhydrous form. The neutral sulfate $(N_2H_4)_2.H_2SO_4$ is more soluble in water but is more difficult to obtain in anhydrous form. Both salts may be used in the process of the present invention.

In the treatment of hydrazine sulfates with liquid ammonia at about −33° C., i. e., the boiling point of liquid $NH_3$, the reaction products are free hydrazine and an ammonia addition product or complex known as the triammonate of ammonium sulfate. With the acid sulfate it is formed according to the following equation:

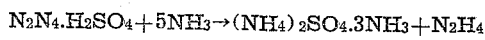

$$N_2H_4.H_2SO_4 + 5NH_3 \rightarrow (NH_4)_2SO_4.3NH_3 + N_2H_4$$

Aside from the fact that this reaction uses up ammonia which, for economic reasons, must be recovered later on, it complicates the process from an engineering point of view and particularly so as the triammonate of ammonium sulfate is an extremely voluminous solid. During the reaction of hydrazine sulfate with liquid ammonia as described above, for example, such an increase in volume occurs in the solid phase that it is difficult and uneconomical to design and construct apparatus in which the inevitable expansion can take place safely. This is a serious disadvantage of the prior processes avoided by the process of the present invention.

It has also been found, using a slurry of the hydrazine sulfate in liquid ammonia at atmospheric pressure, that an equilibrium mixture is obtained in which the hydrazine concentration is only about 2.5–3%. This also is a serious disadvantage of this process as a large excess of liquid ammonia is required to push the reaction to completion. The recovery of the ammonia from the resulting reaction mixtures also presents problems of recompression using expensive equipment. These disadvantages are all avoided by the process of the present invention. Although formation of the triammonate can be avoided by treatment of the sulfate salts with gaseous ammonia at higher temperatures, pressure equipment must be used with resulting increased capital and operating costs. The reaction is difficult to conduct satisfactorily because contact between a solid reactant and a gaseous reactant is required which is further complicated by the fact that the reaction produces a liquid product and a solid byproduct which seems to function as a cementing material, causing adhesion of the particles, channelling and eventually complete stoppage of the reaction. Accordingly, yields in the gaseous ammonia reaction are low and the process is uneconomic because of high cost and mechanical complexity.

I have discovered that ammonia reacts readily with a hydrazine sulfate at ordinary temperatures when the ammonia is dissolved in a low boiling organic solvent; i. e., an aliphatic ether or an alcohol, to form the free hydrazine base and ammonium sulfate. In the reaction between the solid hydrazine sulfate and the ammonia, in the presence of the solvent the bulky triammonate of ammonium sulfate is not formed. Thus when a slurry of a hydrazine sulfate in a suitable solvent; e. g., methanol, reacts with anhydrous ammonia, a convenient process is provided which is not subject to the triammonate difficulties of previously described processes. Subsequent separation of the solid ammonium sulfate from the solution of hydrazine in ammonia and solvent is easily accomplished by filtration, and the separation of hydrazine from the filtrate is also easily accomplished by fractional distillation. All the reactants and product are maintained in anhydrous condition and the resulting hydrazine is also anhydrous.

Suitable solvents for use in the present invention are liquid at room temperatures and include the aliphatic ethers and alcohols having boiling points under atmospheric pressure of below about 85° C. Examples include methyl, ethyl and isopropyl alcohols, and diethyl ether. Mixtures of these solvents may be used. I have found that these materials have suitable solubility for ammonia and hydrazine together with insolubility for ammonium sulfate without interference with effective reaction and product recovery. The hydrazine sulfate starting materials also are not soluble in the organic solvents.

The reaction is preferably conducted at about 20–30° C., e. g., room temperatures or somewhat higher up to about 50° C. Temperatures below room temperatures, e. g., 15° C. are satisfactory but much lower temperatures are less advantageous due to the slow rate of reaction. At temperatures much above 50° C., the solubility of ammonia in the solvents also becomes too low to effect complete reaction in a reasonable time.

One of the important advantages of the present invention is that much more concentrated solutions of hydrazine than 2.5–3% may be prepared without reaching equilibrium or stoppage of the reaction. I have found, however, that with concentrations above about 20% of hydrazine in the reaction mixture, hydrazine sulfate is dissolved. On evaporation of the solvent, the hydrazine then is undesirably contaminated by dissolved sulfate. In methanol, for example, a 15% solution of hydrazine contacted with hydrazine acid sulfate showed on evaporation no sulfate in the residual hydrazine. However, a 38% solution at 30° C. dissolved sufficient sulfate to show on evaporation about 4.8% sulfate in the residual hydrazine. In carrying out the process of the present invention the solvent should therefore be present in adequate amounts to maintain the concentration of hydrazine in the solvent during the reaction below about 20% and preferably not above 15%. This can be readily determined by the amount of hydrazine sulfate being treated.

Sufficient ammonia should be introduced to provide at least the theoretical amount required to react with the hydrazine sulfate charged. More is advantageous and it may be easily recovered, for example, by distillation and reused. Preferably, the solution is kept saturated by ammonia addition.

The process of the present invention may be carried out in any of several ways. A suitable quantity of methanol and solid hydrazine acid sulfate may be charged, for example, into a suitable reactor provided with an agitating device for maintaining solids in suspension. When a suitably homogeneous slurry has been produced by agitation, ammonia gas is introduced into the slurry in at least sufficient quantity theoretically to react with the hydrazine salt charged. It is advantageous to provide an excess of ammonia and, ordinarily, saturation of the methanol with ammonia gas provides an ample excess. Alternatively, a solution of ammonia in methanol may be added to the slurry of hydrazine salt in methanol, or liquid ammonia may be introduced directly into the methanol slurry of the salt. In any of these cases, the ammonia present in the reaction mixture is dissolved in the solvent.

The reaction time is largely dependent on the particle size of the hydrazine salt. It is advantageous, therefore, to reduce the particle size to as small dimensions as possible before reaction or to provide suitable means for grinding the solid phase during reaction. The process may be carried out, for example, in a ball mill to which is charged the hydrazine sulfate, solvent and ammonia. During the reaction the solid phase is agitated and maintained in a finely divided condition, and any superficial covering of ammonium sulfate on the hydrazine sulfate is continuously removed, exposing fresh surfaces of the latter to reaction with ammonia.

My invention is also advantageously adapted to continuous processing. Thus the reacted slurry from one of a series of reaction chambers may be charged to a filter where the solid ammonium sulfate is removed and washed with additional solvent to remove free hydrazine. The filtrate and washings are continuously charged to a distillation tower from which ammonia, solvent and hydrazine are continuously and separately removed. The ammonia and solvent together with additional hydrazine salt may be recharged to a reaction chamber while another is being filtered and still another is reacting. Alternatively, a slurry of hydrazine sulfate in solvent may be charged to a continuous elongated reactor in countercurrent flow to a solution of ammonia in the solvent. A solution of hydrazine in ammonia and solvent is removed continuously at one end and a slurry of ammonium sulfate at the other. The latter is charged to a continuous filter and washed with solvent. The washed salt is discharged from the filter while the filtrate and washings are combined with the solution of hydrazine, and charged to a distillation tower. It is usually advantageous to dry the ammonium sulfate, returning any recovered solvent to the system. If desired the ammonium sulfate may be converted into recoverable ammonia by the use of lime, and calcium sulfate then is discharged as an end product.

Hence, by the process of my invention, the necessity of using expensive refrigerating, liquefying, pressurizing equipment, etc., is avoided. The heat of reaction is conveniently absorbed by the solvent without severe vaporization of ammonia and the operation proceeds satisfactorily at room temperatures. Solutions which are more concentrated in hydrazine than 2.5–3% are also readily obtainable so that economies are provided in ammonia utilization and product recovery. In addition, the manipulation of the ammonium sulfate produced is much easier than its bulky triammonate and the recovery of ammonia from this latter product is further avoided.

My invention will be illustrated by the following examples which, however, are illustrative only and are not intended to define reaction or procedural limitations.

*Example I*

A jacketed reaction chamber, fitted with a stirrer and an inlet tube for gas having its outlet end near the bottom of the reaction chamber together with thermowells and a reflux condenser, was charged with 784 parts by weight of anhydrous methanol which was then saturated with dry ammonia gas in the reaction chamber. Five hundred and twenty parts by weight of hydrazine acid sulfate was then added and the ammonia flow continued so as to maintain the mixture saturated with respect to ammonia. The slurry was agitated for 6 hours at 30° C. and then filtered. The liquor contained about 8.8% by weight of hydrazine,

Example II

The procedure of Example I was used except that the hydrazine acid sulfate was rolled in a ball mill for 6 hours before charging to the reaction chamber. In this case, after agitating the slurry for 4 hours and filtering, the liquor contained about 10.6% by weight of hydrazine.

Example III

Solid anhydrous hydrazine acid sulfate was added to ethyl ether saturated with ammonia and the reaction allowed to proceed at room temperature. The reaction mixture was filtered and the filtrate upon analysis showed the presence of hydrazine in good yield.

Example IV

Forty-eight parts of hydrazine acid sulfate was agitated for 30 minutes with 90.4 parts by weight of methanol. During the half hour gaseous ammonia was passed into the slurry and the temperature rose to about 50° C. largely due to the heat of solution of the gas in the alcohol. The slurry was filtered and the filtrate found to contain about 20 grams per liter of hydrazine.

Example V

The procedure of Example IV was repeated, except that methanol previously saturated with ammonia gas was added to solid hydrazine acid sulfate, and similar results were obtained.

Example VI

The procedure of Example IV was repeated, except that ethanol was substituted for methanol, and again similar results were obtained.

Dihydrazine sulfate, or the neutral salt $(N_2H_4)_2 \cdot H_2SO_4$, may be substituted in the above examples for the hydrazine acid sulfate with the advantage of reducing ammonia consumption per mole of hydrazine produced.

The hydrazine is recovered from the reaction mixtures of the above examples by fractional distillation as previously indicated. The procedure followed on a composite sample is set out below by way of illustration.

Example VII

A mixture of about 74 parts by weight of hydrazine and 68 parts of ammonia in about 828 parts of methanol, representative of a reaction mixture obtained by compositing several of the above examples, was charged to a distillation tower using a nitrogen blanket to avoid air contact. On the first distillation most of the ammonia and methanol were recovered up to a vapor temperature of 64° C. and these fractions contained substantially no hydrazine. A mixture of 92.3% hydrazine and 7.7% ammonia was obtained at 112° C. which contained about 82% of the hydrazine. The residue of 14.2 parts by weight contained hydrazine in approximately the same proportion, accounting for approximately a 100% recovery of the hydrazine charged. Pure anhydrous hydrazine is obtained by redistillation or by provision for appropriate initial fractionation.

The process of the present invention thus provides for the high yields of hydrazine obtainable with liquid ammonia and not obtainable with gaseous ammonia, and at the same time avoids the serious disadvantages encountered with liquid ammonia including bulky triammonate formation and stoppage of the reaction at concentrations of 2.5–3% hydrazine. In addition, the process of the present invention does not require refrigerating, liquefying or pressure equipment. It can thus be carried out less expensively than prior processes, another distinct advantage in commercial operations.

The present application is a continuation-in-part of Serial No. 72,092 filed January 21, 1949, now abandoned.

I claim:

1. The process of preparing anhydrous hydrazine which comprises reacting hydrazine sulfate with a solution of ammonia in an organic liquid selected from the group consisting of aliphatic alcohols and ethers and mixtures of the same, having a boiling point at atmospheric pressure below about 85° C., the amount of said organic liquid in the reaction mixture being adequate to maintain the concentration of the hydrazine in the liquid during the reaction below about 20%, and thereafter recovering the hydrazine from the reaction mixture by fractional distillation.

2. The process of claim 1 where the organic liquid is methanol.

3. The process of claim 1 where the hydrazine sulfate is the acid sulfate, the organic liquid is methanol, and the reaction is carried out at temperatures of from ordinary room temperatures up to about 50° C.

4. The process of claim 1 where the hydrazine sulfate is the neutral sulfate, the organic liquid is methanol, and the reaction is carried out at temperatures of from ordinary room temperatures up to about 50° C.

No references cited.